(12) United States Patent
Koul et al.

(10) Patent No.: US 7,975,104 B2
(45) Date of Patent: Jul. 5, 2011

(54) METHOD FOR PRESERVING DATA INTEGRITY BY BREAKING THE REDUNDANT ARRAY OF INDEPENDENT DISKS LEVEL 1(RAID1)

(75) Inventors: Sunny Koul, Karnataka (IN); Ranjan Kumar, Jharkhand (IN); Gururaj Shivashankar Morabad, Karnataka (IN)

(73) Assignee: LSI Corporation, Milpitas, CA (US)

( * ) Notice: Subject to any disclaimer, the term of this patent is extended or adjusted under 35 U.S.C. 154(b) by 411 days.

(21) Appl. No.: 12/339,105

(22) Filed: Dec. 19, 2008

(65) Prior Publication Data
US 2010/0161898 A1 Jun. 24, 2010

(51) Int. Cl.
*G06F 12/00* (2006.01)
(52) U.S. Cl. ...................................... 711/114
(58) Field of Classification Search .................... None
See application file for complete search history.

(56) References Cited

U.S. PATENT DOCUMENTS

| | | | | |
|---|---|---|---|---|
| 7,143,256 | B2 * | 11/2006 | Maciel | 711/165 |
| 7,788,541 | B2 * | 8/2010 | Shellhamer | 714/42 |
| 2007/0245765 | A1 * | 10/2007 | Casher | 713/320 |

* cited by examiner

*Primary Examiner* — Hiep T Nguyen
(74) *Attorney, Agent, or Firm* — Prakash Nama; Global IP Services, PLLC (57) ABSTRACT

A method of breaking a redundant array of independent disks level 1 (RAID 1 ) for preservation of data integrity is disclosed. In one embodiment, a method for breaking a RAID 1 to preserve data integrity of the RAID 1 includes breaking a redundancy of the RAID 1 when a size of data stored in the RAID 1 exceeds a storage capacity of the RAID 1, where the RAID 1 includes a first disk and a second disk mirroring the first disk. Further, the method includes writing a portion of the data exceeding the storage capacity of the RAID 1 to the second disk, and restoring the redundancy of the RAID 1 by using two additional disks implemented to the RAID 1.

20 Claims, 7 Drawing Sheets

METHOD FOR PRESERVING DATA INTEGRITY BY BREAKING THE REDUNDANT ARRAY OF INDEPENDENT DISKS LEVEL 1(RAID1)

FIELD OF TECHNOLOGY

Embodiments of the present invention relate to the field of electronics. More particularly, embodiments of the present invention relate to data management associated with a redundant array of independent disks (RAID).

BACKGROUND

Redundant Array of Independent Disks (RAID) is a technology that employs simultaneous use of two or more hard disk drives to achieve greater levels of performance, reliability, and/or larger data volume sizes. A RAID level 1 (hereafter referred as RAID 1) maintains and stores a complete copy of the data stored on a first disk of the RAID 1 on a second disk of the RAID 1. Thus, in the event of a failure of the first disk, the complete copy of the data on the second disk is available and vice versa. Further, the data on the second disk may be used to recreate the data on the first disk when the first disk is replaced or repaired.

However, if the amount of data that needs to be stored to the RAID 1 exceeds the storage capacity of the RAID 1 in real time due to an unforeseen event (e.g., heavy data traffic), data loss is bound to occur due to insufficient space for holding that excess data.

SUMMARY

A method of breaking a redundant array of independent disks level 1 (RAID 1) for preservation of data integrity is disclosed. In one aspect, a method for breaking a RAID 1 to preserve data integrity of the RAID 1 includes breaking a redundancy of the RAID 1 when a size of data stored in the RAID 1 exceeds a storage capacity of the RAID 1. For example, the RAID 1 includes a first disk and a second disk mirroring the first disk. Further, the method includes writing a portion of the data exceeding the storage capacity of the RAID 1 to the second disk, and restoring the redundancy of the RAID 1 by using two additional disks implemented to the RAID 1.

In another aspect, a RAID controller coupled to a host central processing unit (CPU) for breaking a RAID 1 to preserve data integrity of the RAID 1 by performing a method including breaking a redundancy of the RAID 1 when a size of data stored in the RAID 1 exceeds a storage capacity of the RAID 1, where the RAID 1 includes a first disk and a second disk mirroring the first disk. Further, the method includes writing a portion of the data exceeding the storage capacity of the RAID 1 to the second disk, and restoring the redundancy of the RAID 1 by using two additional disks implemented to the RAID 1.

The methods, and/or systems disclosed herein may be implemented by any means for achieving various aspects, and may be executed in a form of a machine readable medium embodying a set of instructions that, when executed by a machine, cause the machine to perform any of the operations disclosed herein.

BRIEF DESCRIPTION OF THE DRAWINGS

Embodiments of the present invention are illustrated by way of an example and not limited to the figures of the accompanying drawings, in which like references indicate similar elements and in which.

Other features of the present embodiments will be apparent from the accompanying drawings and from the detailed description that follows.

DETAILED DESCRIPTION

A METHOD FOR PRESERVING DATA INTEGRITY BY BREAKING THE REDUNDANT ARRAY OF INDEPENDENT DISKS LEVEL 1 (RAID 1) is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1A:
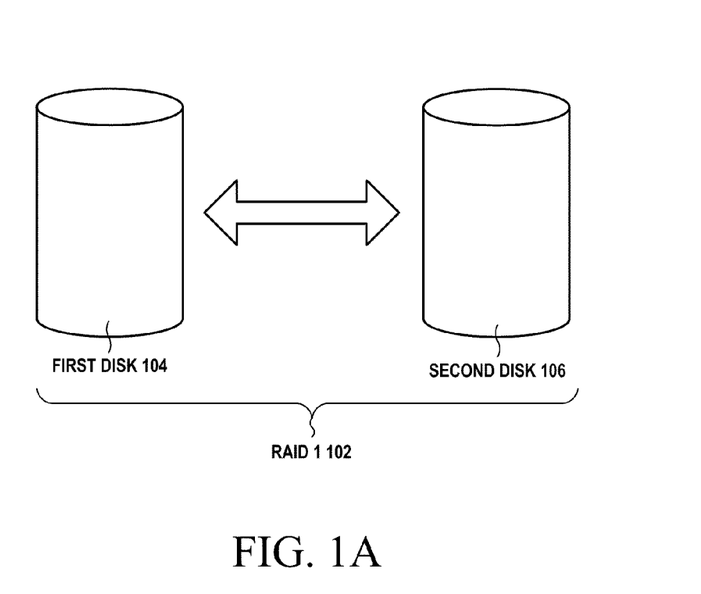
FIGS. 1A through 1D illustrate an exemplary scheme of RAID 1 by virtue of which redundancy of the RAID 1 is first broken to preserve data integrity of the RAID 1 and is later restored, according to one embodiment.
Figure 1B:
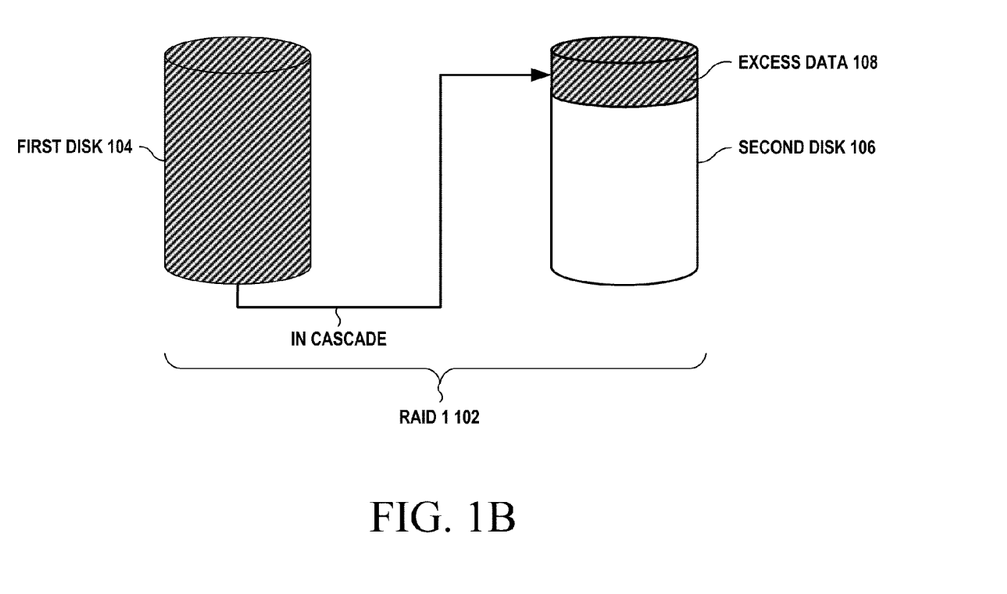

FIGS. 1A through 1D illustrate an exemplary scheme of a RAID 1 102 by virtue of which redundancy of the RAID 1 102 is first broken to preserve data integrity of the RAID 1 102 and is later restored, according to one embodiment. Particularly, FIG. 1A shows the RAID 1 102 having a first disk 104 and a second disk 106 which mirrors the first disk 104. Further, FIG. 1B illustrates the step of breaking the redundancy of the RAID 1 102 when a size of data to be stored in the RAID 1 102 exceeds a storage capacity of the RAID 1 102. It can be seen from FIG. 1B that, the first disk 104 is fully filled with data, which means that the storage capacity of the RAID 1 102 is full (since the second disk 106 mirrors the first disk 104). Further, if a portion of the data exceeding the storage capacity of the RAID 1 102 (i.e., the excess data 108) is to be stored in the RAID 1 102, then the redundancy of the RAID 1 102 is broken. In one embodiment, the redundancy of the RAID 1 102 is broken by terminating the mirroring of the first disk 104 by the second disk 106.

Further, as shown in FIG. 1B, the first disk 104 and the second disk 106 of the RAID 1 102 are coupled in a cascade and the excess data 108 is written to the second disk 106. In one example embodiment, a copyback of the excess data 108 to the second disk 106 is performed. In one exemplary implementation, an alarm (e.g., an audible alarm and/or a visual alarm) is generated upon breaking the redundancy of the RAID 1 102 due to the insufficient storage capacity of the RAID 1 102.

Figure 1C:
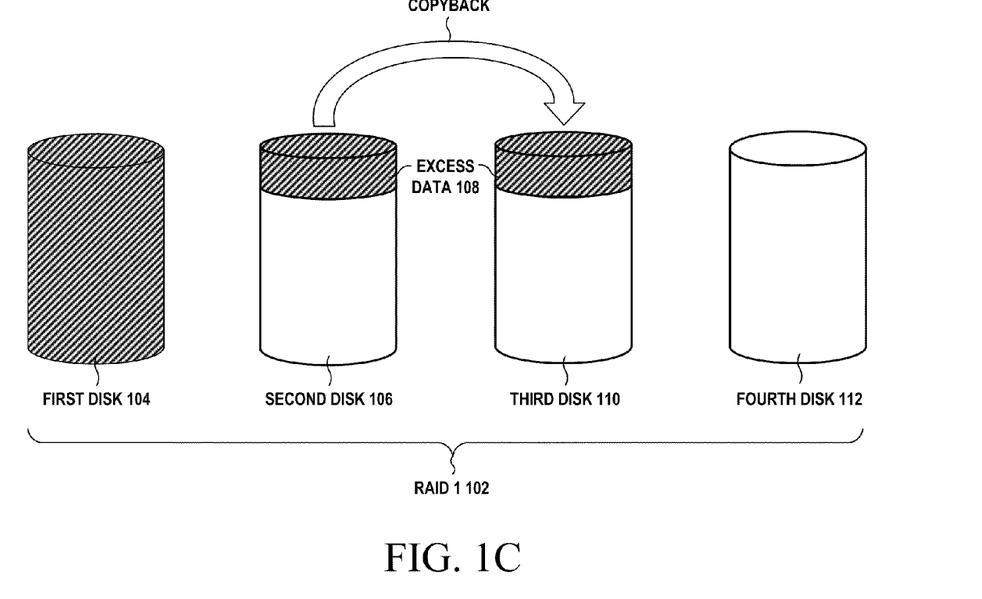
Figure 1D:
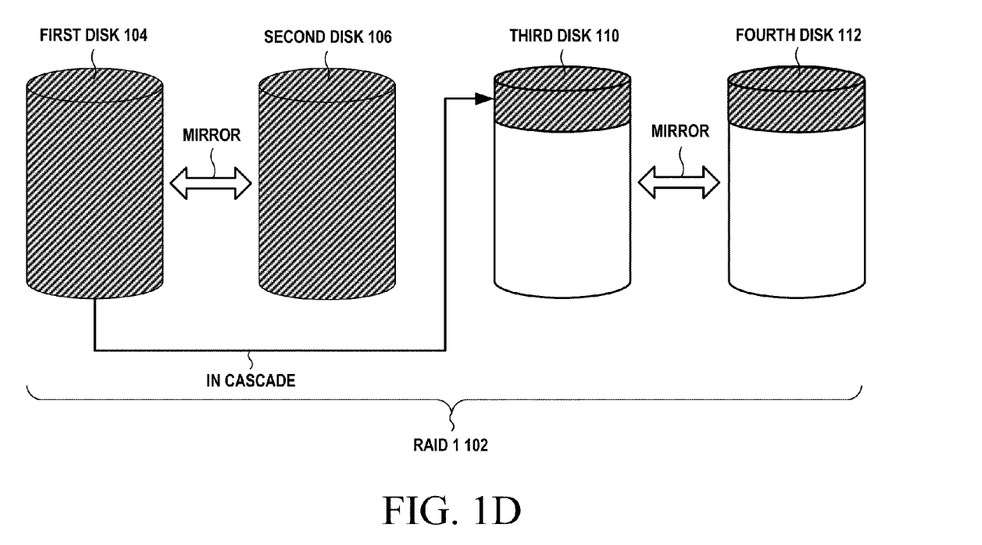

Further, FIGS. 1C and 1D together illustrate the step of restoring the redundancy of the RAID 1 102 using two additional disks implemented to the RAID 1 102. As shown in FIG. 1C, a third disk 110 and a fourth disk 112 are two additional disks that are implemented to the RAID 1 102 for restoring the redundancy of the RAID 1 102. For example, a user (e.g., a system administrator) inserts the third disk 110 and the fourth disk 112 upon generation of the alarm for restoring the redundancy of the RAID 1 102.

Further, as shown in FIG. 1C, a copyback of the excess data 108 from the second disk 106 to the third disk 110 is performed. It should be noted that, upon performing the copyback of the excess data 108, the first disk 104 and the third disk 110 are filled with the complete data, while the second disk 106 and the fourth disk 112 are empty. Furthermore, as shown in FIG. 1D, the second disk 106 mirrors the first disk 104 and the fourth disk 112 mirrors the third disk 110, thus restoring the redundancy of the RAID 1 102. It is appreciated that the redundancy of the RAID 1 102 is restored either by performing a rebuild operation or by performing a copyback operation.

In one exemplary implementation, the second disk 106 is rebuilt using the first disk 104 and the fourth disk 112 is rebuilt using the third disk 110. It is appreciated that the rebuilding of the second disk 106 and the rebuilding of the fourth disk 112 are simultaneously performed. In another exemplary implementation, a copyback to the second disk 106 is performed using the first disk 104 and a copyback to the fourth disk 112 is performed using the third disk 110. It is appreciated that, the copyback to the second disk 106 and the copyback to the fourth disk 112 are simultaneously performed.

Figure 2A:
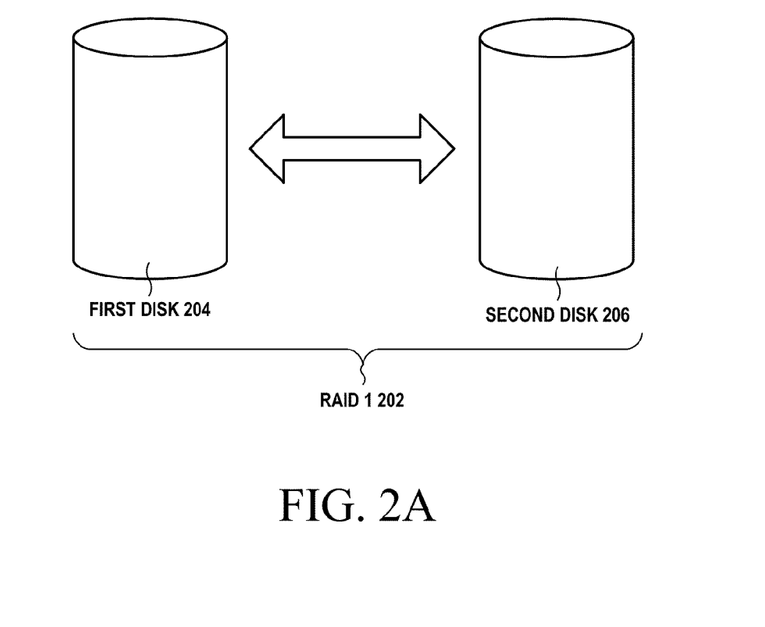
FIGS. 2A through 2C illustrate another exemplary scheme of RAID 1 by virtue of which redundancy of the RAID 1 is first broken to preserve data integrity of the RAID 1 and is later restored, according to one embodiment.
Figure 2B:
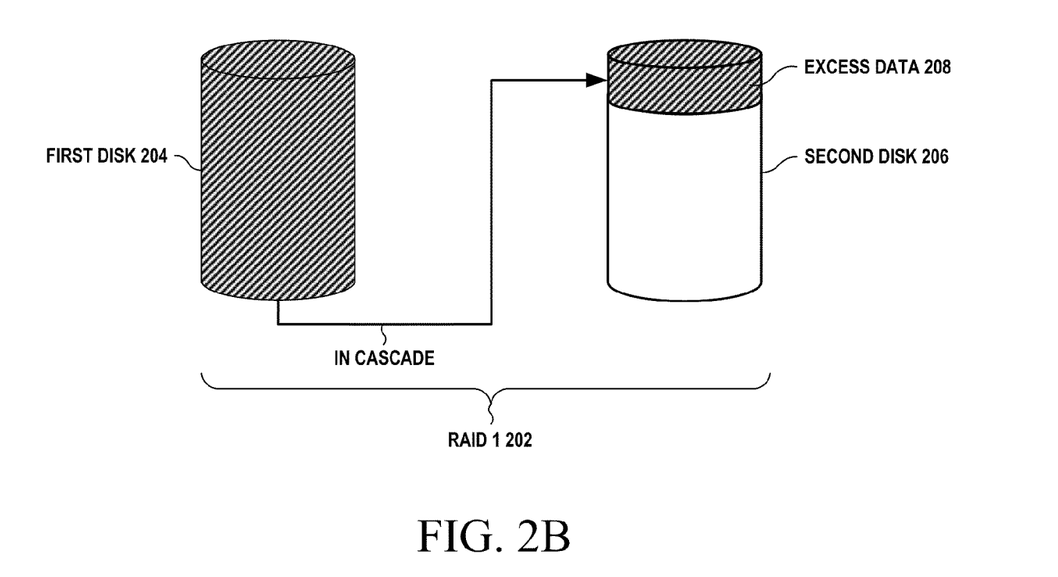
Figure 2C:
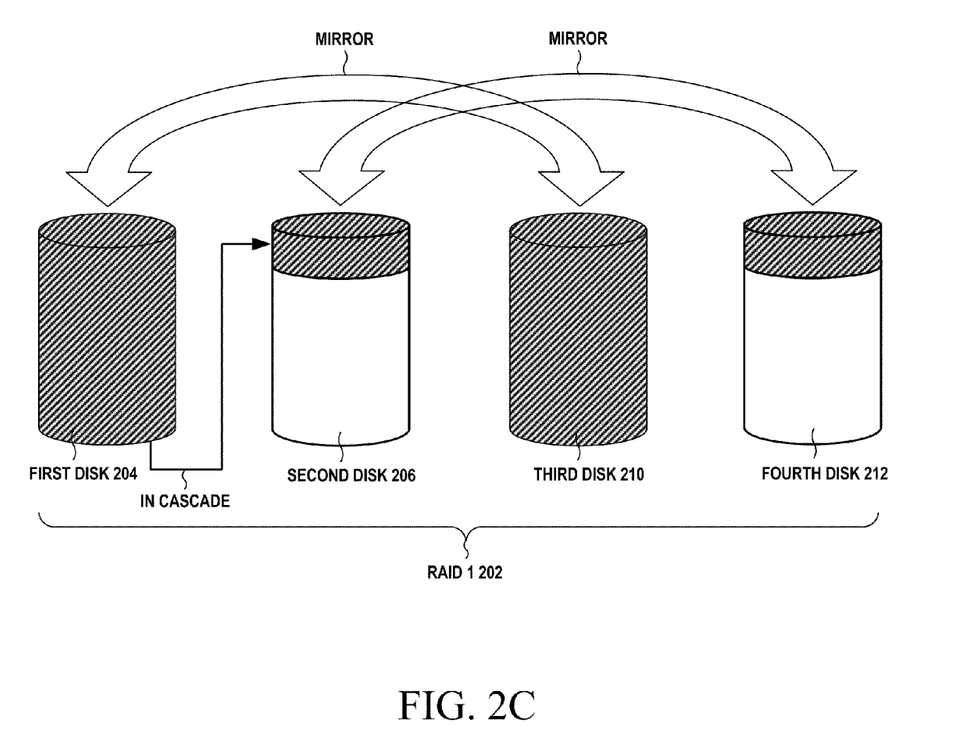

FIGS. 2A through 2C illustrate another exemplary scheme of a RAID 1 202 by virtue of which redundancy of the RAID 1 202 is first broken to preserve data integrity of the RAID 1 202 and is later restored, according to one embodiment. Particularly, FIG. 2A shows the RAID 1 202 having a first disk 204 and a second disk 206 which mirrors the first disk 204. Further, FIG. 2B illustrates the step of breaking the redundancy of the RAID 1 202 when a size of data to be stored in the RAID 1 202 exceeds a storage capacity of the RAID 1 202. In one embodiment, the redundancy of the RAID 1 202 is broken by terminating the mirroring of the first disk 204 by the second disk 206.

Further, as shown in FIG. 2B, the first disk 204 and the second disk 206 of the RAID 1 202 are coupled in a cascade and a portion of the data exceeding the storage capacity of the RAID 1 202 (i.e., excess data 208) is written to the second disk 206. In one embodiment, a copyback of the excess data 208 to the second disk 206 is performed. In one exemplary implementation, an alarm (e.g., an audible alarm and/or a visual alarm is generated upon breaking the redundancy of the RAID 1 202 due to the insufficient storage capacity of the RAID 1 202.

Further, FIG. 2C illustrates the step of restoring the redundancy of the RAID 1 202 by using two additional disks implemented to the RAID 1 202. As shown in FIG. 2C, a third disk 210 and a fourth disk 212 are the two additional disks that are implemented to the RAID 1 202 for restoring the redundancy of the RAID 1 202. Further, as shown in FIG. 2C, the third disk 210 mirrors the first disk 204 and the fourth disk 212 mirrors the second disk 206, thus restoring the redundancy of the RAID 1 202. It is appreciated that the redundancy of the RAID 1 202 is restored either by performing a rebuild operation or by performing a copyback operation.

In one exemplary implementation, the third disk 210 is rebuilt using the first disk 204 and the fourth disk 212 is rebuilt using the second disk 206. It is appreciated that the rebuilding of the third disk 210 and the rebuilding of the fourth disk 212 are simultaneously performed. In another exemplary implementation, a copyback to the third disk 210 is performed using the first disk 204 and a copyback to the fourth disk 212 is performed using the second disk 206. It is appreciated that the copyback to the third disk 210 and the copyback to the fourth disk 212 are performed simultaneously.

Figure 3:
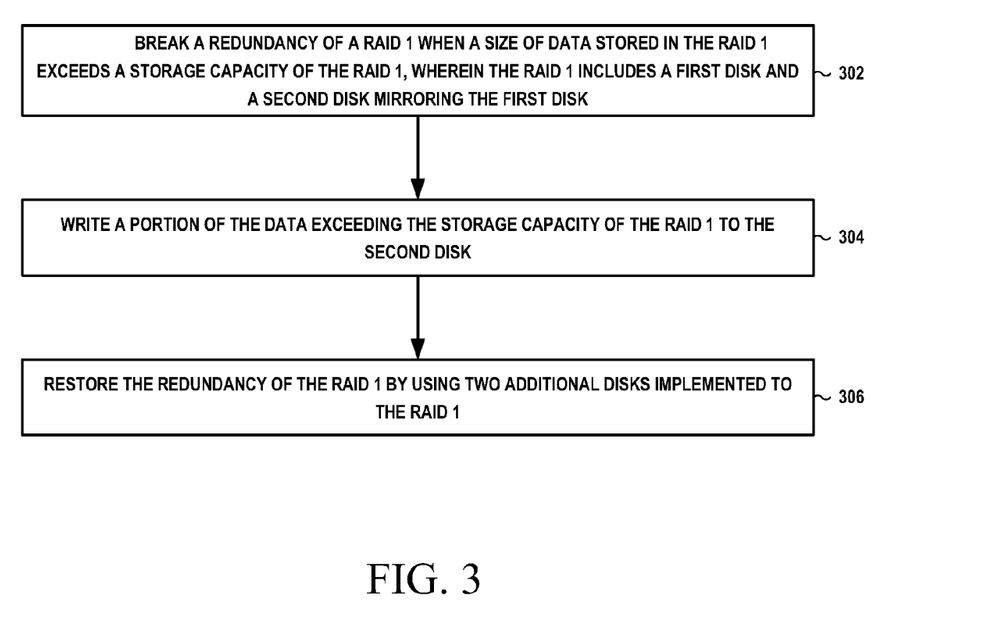
FIG. 3 is a process flow chart of an exemplary method for breaking a RAID 1 to preserve data integrity of the RAID 1, according to one embodiment.

FIG. 3 is a process flow chart of an exemplary method for breaking a RAID 1 to preserve data integrity of the RAID 1, according to one embodiment. In operation 302, a redundancy of the RAID 1 is broken when a size of data stored in the RAID 1 exceeds a storage capacity of the RAID 1. For example, the RAID 1 includes a first disk and a second disk which mirrors the first disk. In operation 304, a portion of the data exceeding the storage capacity of the RAID 1 is written to the second disk. In operation 306, the redundancy of the RAID 1 is restored by using two additional disks implemented to the RAID 1. Moreover, in one example embodiment, a computer readable medium (e.g., firmware for an I/O processor and/or a controller associated with the RAID 1 of FIGS. 1A through 1D and FIGS. 2A through 2C) for breaking the RAID 1 to preserve data integrity of the RAID 1 having instructions that, when executed by a computer, cause the computer to perform the method illustrated in FIG. 3.

Figure 4:
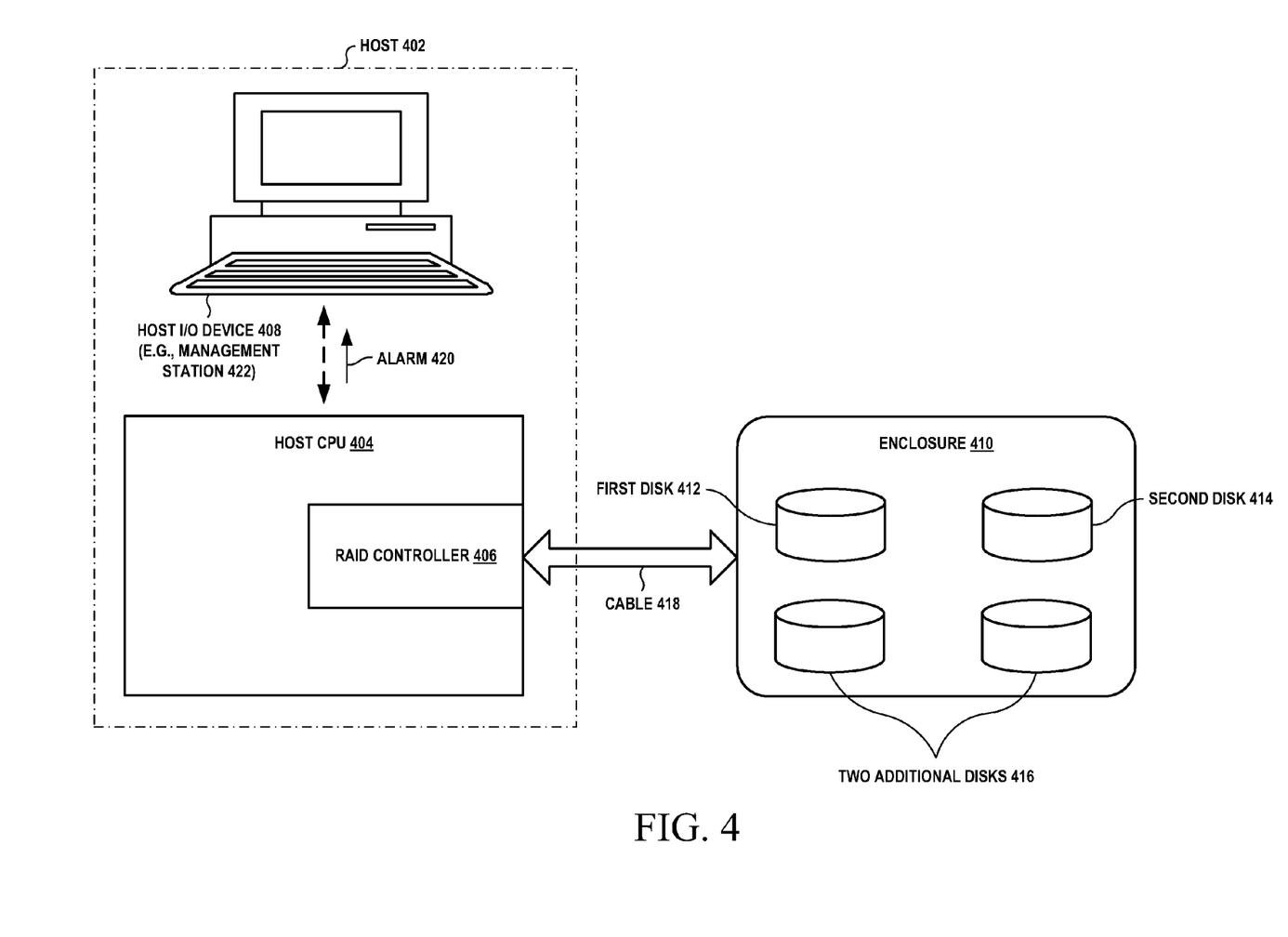
FIG. 4 is a block diagram of an exemplary direct attached storage (DAS) which implements the method illustrated in FIG. 3, according to one embodiment.

FIG. 4 is a block diagram of an exemplary direct attached storage (DAS) 400 which implements the method illustrated in FIG. 3, according to one embodiment. As shown in FIG. 4, the DAS 400 includes a host 402 and an enclosure 410 (e.g., physical disks or logical disks). Further, as shown in FIG. 4, the host 402 includes a host central processing unit (CPU) 404 and a host input/output (I/O) device 408 (e.g., a management station 422). Also, as shown in FIG. 4, a RAID controller 406 is coupled to the host CPU 404 for breaking a RAID 1 to preserve data integrity of the RAID 1. Furthermore, as shown in FIG. 4, the host I/O device 408 is coupled to the host CPU 404.

Also, in FIG. 4, the enclosure 410 includes a first disk 412, a second disk 414, and two additional disks 416. It is appreciated that the first disk 412, the second disk 414, and the two additional disks 416 are exemplary embodiments of the first disk 104, the second disk 106, the third disk 110 and the fourth disk 112 of the RAID 1 102 of FIGS. 1A through 1D, and the first disk 204, the second disk 206, the third disk 210 and the fourth disk 212 of the RAID 1 202 of FIGS. 2A through 2C, respectively. Moreover, as shown in FIG. 4, the first disk 412, the second disk 414, and the two additional disks 416 are coupled to the host CPU 404 in the DAS 400 via a cable 418 (e.g., SCS, FC, SAS, etc.).

In operation, the RAID controller 406 is operable for breaking a redundancy of the RAID 1 when a size of data stored in the RAID 1 exceeds a storage capacity of the RAID 1 , where the RAID 1 includes the first disk 412 and the second disk 414, and for writing a portion of the data exceeding the storage capacity of the RAID 1 to the second disk 414. Further, the RAID controller 406 is also operable for restoring the redundancy of the RAID 1 by using the two additional disks 416 implemented to the RAID 1. In one exemplary implementation, the breaking the redundancy of the RAID 1 by the RAID controller 406 causes a generation of an alarm 420.

The alarm 420 may be an audible alarm or visual alarm. The audible alarm may be a hardware feature of the RAID controller 406. The RAID controller 406 may have an alarm built on it to beep for certain critical conditions. The visual alarm may be a software alarm generated at the OS level when the application which interacts with the hardware get the alarm signal from the hardware and convert it to a user understandable message and display it to the user).

For example, if the control of the RAID controller 406 is at the BIOS level, the alarm may be an audible alarm. But, when the user works at the OS level with an application like Mega-RAID Storage Manager (MSM®) or Dell OMSS®, etc, the user may be working remotely from the RAID storage device (e.g., trays, drives, etc.). In such scenario, the hardware alarm may not be audible. So, the user may be alarmed when the application gets the interrupt from the RAID controller 406 so that the user may take an appropriate action. As shown in FIG. 4, the alarm 420 is forwarded to the management station 422 (i.e., the host I/O device 408) coupled to the host CPU 404.

Figure 5:
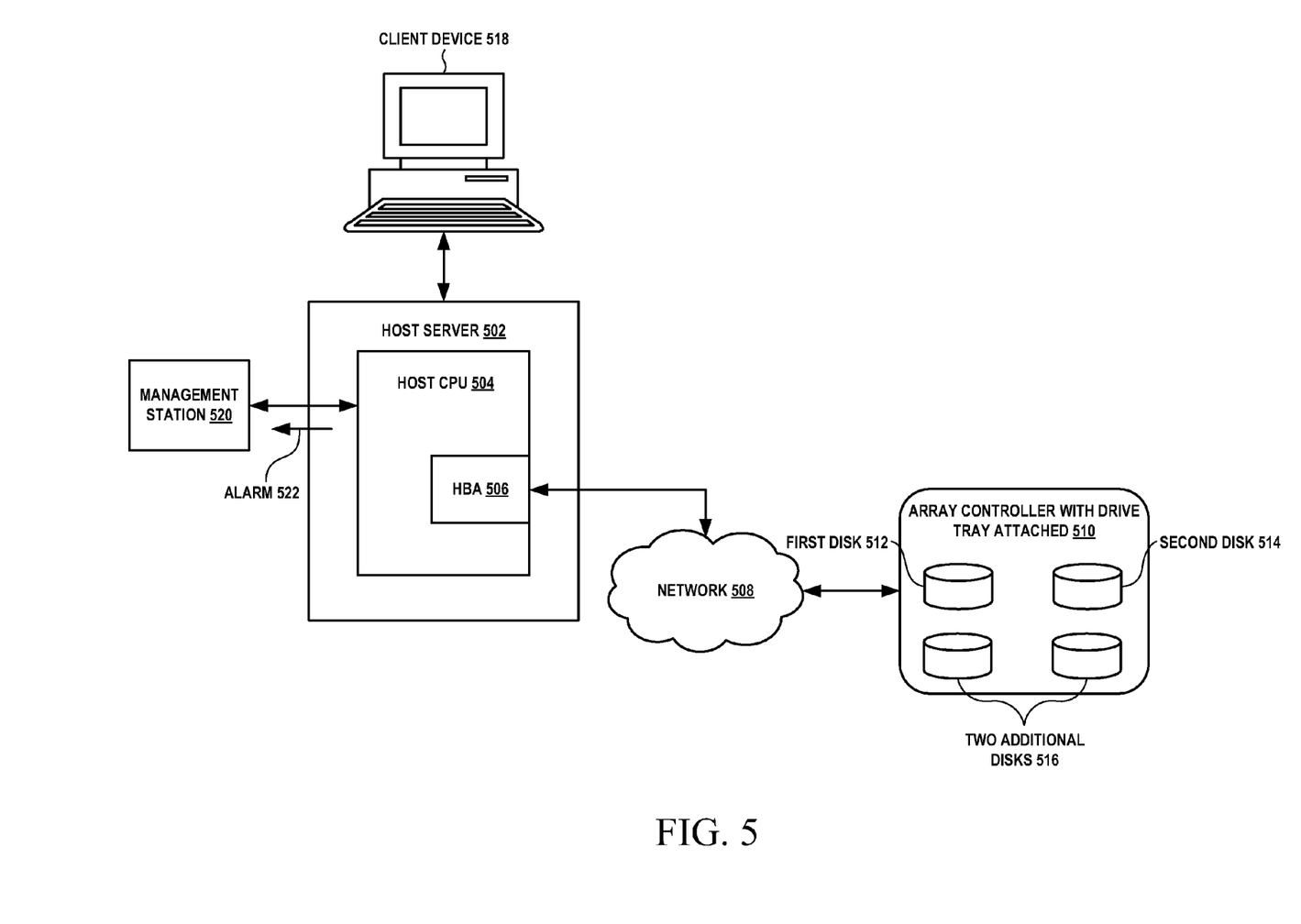
FIG. 5 is a block diagram of an exemplary storage area network (SAN) which implements the method illustrated in FIG. 3, according to one embodiment.

FIG. 5 is a block diagram of an exemplary storage area network (SAN) 500 which implements the method illustrated in FIG. 3, according to one embodiment. As shown in FIG. 5, the SAN 500 includes a host server 502 and an array controller with drive tray attached 510. Further as shown in FIG. 5, the host server 502 includes a host CPU 504 and a host bus adapter (HBA) 506 (e.g., SCS, FC, SAS, etc.). In one embodiment, the HBA 506 is coupled to the host CPU 504 for breaking a RAID 1 to preserve data integrity of the RAID 1. Furthermore, as shown in FIG. 5, the array controller with drive tray attached 510 includes a first disk 512, a second disk 514, and two additional disks 516 which are coupled to the host CPU 504 via a network 508.

It is appreciated that the first disk 512, the second disk 514, and the two additional disks 516 are exemplary embodiments of the first disk 104, the second disk 106, the third disk 110 and the fourth disk 112 of the RAID 1 102 of FIGS. 1A through 1D, and the first disk 204, the second disk 206, the third disk 210 and the fourth disk 212 of the RAID 1 202 of FIGS. 2A through 2C, respectively. Also, as shown in FIG. 5, a client device 518 is coupled to the host server 502 for accessing the host CPU 504. Moreover, as shown in FIG. 5, a management station 520 is coupled to the host CPU 504.

In operation, the HBA 506 is operable for breaking a redundancy of the RAID 1 when a size of data stored in the RAID 1 exceeds a storage capacity of the RAID 1, where the RAID 1 includes the first disk 512 and the second disk 514, and writing a portion of the data exceeding the storage capacity of the RAID 1 to the second disk 514. Further, the HBA 506 is also operable for restoring the redundancy of the RAID 1 by using the two additional disks 516 implemented to the RAID 1. In one exemplary implementation, the breaking the redundancy of the RAID 1 by the HBA 506 causes a generation of an alarm 518. As shown in FIG. 5, the alarm 518 is forwarded to the management station 520 coupled to the host CPU 504.

The above-described method ensures integrity of data, in cases of heavy data traffic for storage of large amount of data, along with drive failure protection and increased storage capacity. Further, the above-described method can survive two drive failures. Furthermore, the above-described technique can be implemented in servers including but not limited to file and application servers, intranet servers, and database servers.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/ or software (e.g., embodied in a machine readable medium). For example, the various electrical structure and methods may be embodied using transistors, logic gates, and electrical circuits (e.g., application specific integrated circuitry (ASIC)).

What is claimed is:

1. A method for breaking a redundant array of independent disks level 1 (RAID 1) to preserve data integrity of the RAID 1, comprising:
    breaking a redundancy of the RAID 1 when a size of data stored in the RAID 1 exceeds a storage capacity of the RAID 1, wherein the RAID 1 comprises a first disk and a second disk mirroring the first disk;
    writing a portion of the data exceeding the storage capacity of the RAID 1 to the second disk; and
    restoring the redundancy of the RAID 1 by using two additional disks implemented to the RAID 1.

2. The method of claim 1, wherein the breaking the redundancy of the RAID 1 comprises generating an alarm.

3. The method of claim 2, wherein the alarm comprises an audible alarm and a visual alarm.

4. The method of claim 1, wherein the breaking the redundancy of the RAID 1 comprises:
    terminating the mirroring of the first disk on the second disk; and
    coupling the first disk and the second disk in a cascade.

5. The method of claim 4, wherein the writing the portion of the data exceeding the storage capacity of the RAID 1 comprises performing a copyback of the portion of the data exceeding the storage capacity of the RAID 1 to the second disk.

6. The method of claim 1, wherein the restoring the redundancy of the RAID 1 comprises:
    performing a copyback of the portion of the data exceeding the storage capacity of the RAID 1 from the second disk to a third disk;
    rebuilding the second disk using the first disk; and
    rebuilding a fourth disk using the third disk, wherein the third disk and the fourth disk are the two additional disks implemented to the RAID 1.

7. The method of claim 6, wherein the rebuilding of the second disk and the rebuilding of the fourth disk are simultaneously performed.

8. The method of claim 1, wherein the restoring the redundancy of the RAID 1 comprises:
    performing a copyback of the portion of the data exceeding the storage capacity of the RAID 1 from the second disk to a third disk;
    performing a copyback to the second disk using the first disk; and
    performing a copyback to a fourth disk using the third disk, wherein the third disk and the fourth disk are the two additional disks implemented to the RAID 1.

9. The method of claim 8, wherein the copyback to the second disk and the copyback to the fourth disk are simultaneously performed.

10. The method of claim 1, wherein the restoring the redundancy of the RAID 1 comprises:
    rebuilding a third disk using the first disk; and
    rebuilding a fourth disk using the second disk, wherein the third disk and the fourth disk are the two additional disks implemented to the RAID 1.

11. The method of claim 10, wherein the rebuilding of the third disk and the rebuilding of the fourth disk are simultaneously performed.

12. The method of claim 1, wherein the restoring the redundancy of the RAID 1 comprises:

performing a copyback to a third disk using the first disk; and performing a copyback to a fourth disk using the second disk, wherein the third disk and the fourth disk are the two additional disks implemented to the RAID 1.

13. The method of claim 12, wherein the copyback to the third disk and the copyback to the fourth disk are simultaneously performed.

14. A computer readable medium for breaking a redundant array of independent disks level 1 (RAID 1) to preserve data integrity of the RAID 1 having instructions that, when executed by a computer, cause the computer to perform a method comprising:

breaking a redundancy of the RAID 1 when a size of data stored in the RAID 1 exceeds a storage capacity of the RAID 1, wherein the RAID 1 comprises a first disk and a second disk mirroring the first disk;

writing a portion of the data exceeding the storage capacity of the RAID 1 to the second disk; and restoring redundancy of the RAID 1 by using at least one disk implemented to the RAID 1.

15. The computer readable medium of claim 14, wherein the breaking the redundancy of the RAID 1 comprises:

terminating the mirroring of the first disk by the second disk; and coupling the first disk and the second disk in a cascade.

16. A RAID controller coupled to a host central processing unit (CPU) for breaking a redundant array of independent disks level 1 (RAID 1) to preserve data integrity of the RAID 1 by performing a method comprising:

breaking a redundancy of the RAID 1 when a size of data stored in the RAID 1 exceeds a storage capacity of the RAID 1, wherein the RAID 1 comprises a first disk and a second disk mirroring the first disk;

writing a portion of the data exceeding the storage capacity of the RAID 1 to the second disk; and restoring redundancy of the RAID 1 by using two additional disks implemented to the RAID 1.

17. The RAID controller of claim 16, wherein the breaking the redundancy of the RAID 1 causes a generation of an alarm.

18. The RAID controller of claim 17, wherein the alarm is forwarded to a management station coupled to the host CPU.

19. The RAID controller of claim 16, wherein the first disk, the second disk, and the two additional disks are coupled to the host CPU in a storage area network (SAN).

20. The RAID controller of claim 16, wherein the first disk, the second disk, and the two additional disks are coupled to the host CPU in a direct attached storage (DAS).

* * * * *